United States Patent [19]

Matthei

[11] Patent Number: 4,531,704
[45] Date of Patent: Jul. 30, 1985

[54] INJECTION MOLDING MACHINE

[75] Inventor: Ernst A. Matthei, Wuppertal, Fed. Rep. of Germany

[73] Assignee: Devalit-Plastik van Deest GmbH & Co. KG, Wuppertal, Fed. Rep. of Germany

[21] Appl. No.: 564,008

[22] Filed: Dec. 21, 1983

[30] Foreign Application Priority Data

Dec. 23, 1982 [DE] Fed. Rep. of Germany ....... 3247723

[51] Int. Cl.³ ............................ B29F 1/00; B29F 1/14; B29C 1/00
[52] U.S. Cl. ...................................... 249/67; 425/556; 425/DIG. 58
[58] Field of Search ........ 425/556, DIG. 58, DIG. 5; 264/318; 249/67, 68

[56] References Cited

U.S. PATENT DOCUMENTS

| 3,283,373 | 11/1966 | Kiefer et al. | 425/DIG. 5 |
| 3,373,460 | 3/1968 | Ladney | 425/DIG. 5 |
| 3,784,342 | 1/1974 | Merklinghaus | 425/DIG. 58 |
| 3,865,529 | 2/1975 | Guzzo | 425/DIG. 58 |
| 3,982,875 | 9/1976 | Abey | 425/DIG. 58 |
| 4,005,101 | 1/1977 | Ruch | 264/318 |
| 4,123,495 | 10/1978 | Abey | 425/DIG. 58 |
| 4,375,948 | 3/1983 | von Holdt | 425/556 |

FOREIGN PATENT DOCUMENTS 2309704  9/1974  Fed. Rep. of Germany .

Primary Examiner—J. Howard Flint, Jr.
Attorney, Agent, or Firm—Toren, McGeady, Stanger, Goldberg & Kiel

[57] ABSTRACT

In an injection moulding machine for the production of undercut mouldings, such as plastics bumpers or fenders for automobiles, the injection mould comprises two relatively movable mould halves (1, 2) and a plurality of mould followers (4, 5, 6, 15, 16, 17) for defining the mould cavity when the mould is closed. The mould followers are all mounted on one mould half (1) and are displaceable relative thereto in directions transverse to the direction (3) in which the mould halves move relative to each other to release the moulding when the mould is opened. The other mould half (2) has recesses (28) for engaging and locating the external surfaces of the mould followers when the mould is closed for a moulding operation.

11 Claims, 3 Drawing Figures

INJECTION MOLDING MACHINE

This invention relates to injection moulding machines in which the injection mould comprises two mould halves which are relatively movable toward and away from each other and which carry mould followers displaceable relative thereto for defining the mould cavity, and hence the internal and external contours of the product to be moulded, when the mould is closed.

Injection moulding machines of this type are used in the production of mouldings having internal and/or external undercut zones, such as plastics bumpers or fenders for automobiles. In these cases it is not possible to employ a single-part mould core for the internal contour and a single-part mould recess for the external contour of the moulding, since the undercuts would prevent the extraction of the moulding from the mould. A contour comprising undercuts must therefore be shaped by a plurality of separately releasable and movable mould parts. Consequently, for simplifying extraction of the product and re-assembly of the mould for a new injection moulding cycle, mould followers displaceable relative to relatively displaceable mould halves are used to form the mould surfaces defining undercut internal and external contours of the moulded component. Such a machine is known in which, during the injection moulding stage, the mould followers are held in position by conical recesses of one of the mould halves (German Patent Specification No. 2,004,525, German Offenlegungsschrift No. 2,004,524).

In the known injection moulding machines of this type, the external contour of the mouldings is formed by one mould half and the internal contour by the other mould half, and mould followers, in the case of undercuts in one or other or both of the contours, are disposed on the appropriate mould half or halves. The moulding is ejected during the extraction operation in the same direction as the two mould halves, as is generally common, are moved apart. The mould halves must therefore move apart from each other in their direction of movement at least twice as far as the depth of the injection moulded component, to enable the moulding to be removed unimpeded between the two opened mould halves transversely to their direction of movement. This leads, in the case of mouldings having a large contour depth, to considerable opening travel distances for the mould halves, which is disadvantageous both in respect of the space requirement for the injection moulding machine and also for its cycle time. If the mouldings also possess undercuts, the mould followers then required will project greatly from the relevant mould half and must, on account of the resultant tilting moment, be of very stable and and therefore heavy construction. Finally, the mould surfaces of an injection moulding machine for products having a large contour depth are difficult to get at in the case of repair and installation work.

The aim of the present invention therefore is to provide an injection moulding machine which makes possible smaller opening travel distances for the mould halves during extraction and subsequent removal of mouldings having relatively large contour depths.

To this end, according to the invention, in an injection moulding machine having an injection mould comprising two mould halves which are relatively movable towards and away from each other, and a plurality of mould followers for defining a mould cavity and thereby the internal and external contours of the product to be moulded when the mould is closed, all of the mould followers are mounted on one of the mould halves with at least some being displaceable relative thereto, and each displaceable mould follower is displaceable transversely to the direction in which the mould halves move relatively to each other.

The concept underlying the present invention lies in rotating the position of the moulding relative to the mould halves through 90° compared with conventional practice, and mounting all the mould cavity surfaces on just one of the mould halves, so that the other mould half need no longer carry any of the pure moulding or shaping surfaces. Indeed, the other mould half may even be dispensed with if the mould followers form the complete mould cavity and are sufficiently firmly locked on their mould half during the injection moulding stage. The second mould half is, however, retained in order to facilitate guiding and securing of the mould followers and to seat the injection nozzles. Furthermore, an injection moulding machine having two mould halves can, in case of need, be adapted for the moulding of simpler components which have a relatively low contour depth and which can be moulded with a core and a mould recess on opposite mould halves as described earlier.

By the invention, the initially described disadvantages are overcome, since the opening travel distance of the mould halves before ejection and removal of the finished moulding from the mould can take place is now approximately only twice as large as the contour width, rather than the contour depth. Consequently, for injection mouldings having a relatively low contour width in comparison with the contour depth, as in the case of bumpers for automobiles, the cycle time of the injection moulding machine is thereby considerably reduced.

An appreciable advantage of the machine in accordance with the invention lies in that all the displacement devices for the mould followers are disposed on the one mould half so that the second mould half can be of considerably simpler construction. Moreover, the equipping of the machine with new mould followers for a different moulding is carried out only on one mould half, which facilitates the alignment of the followers and leads to lower demands of accuracy in the precision of movement of the mould halves.

As a consequence of the rotation of the injection moulding through approximately 90° relative to the conventional orientation in one mould half, the mouldings will be ejected transversely to the direction of relative movement of the mould halves. For this purpose, an extractor device for ejecting the mouldings transversely to the direction in which the mould halves move relative to each other is preferably carried by the mould half which carries the mould followers.

The mutual relative arrangement and displacement of the mould followers is preferably such that their directions of displacement are oriented at right angles to one another, and preferably three mould followers are provided for defining each of the internal and external contours of the injection moulding in the case where there are undercuts in both contours. If only the internal or the external contour of the moulding possesses undercuts, the mould surface defining the undercut-free contour can be provided by a single, non-displaceable mould follower.

Preferably mutually opposite mould followers for defining mutually opposite portions of the internal and external contours of the product to be moulded are received and seated in recesses in the other mould half when the mould is closed, and preferably the recesses are trapezoidal in cross-section. This secures, in a simple manner, accuracy of position of the mutually opposite mould followers not only relative to each other but also relative to the other mould followers.

The injection mould of one example of a machine in accordance with the invention will now be described with reference to the accompanying drawings, in which.

Figure 1:
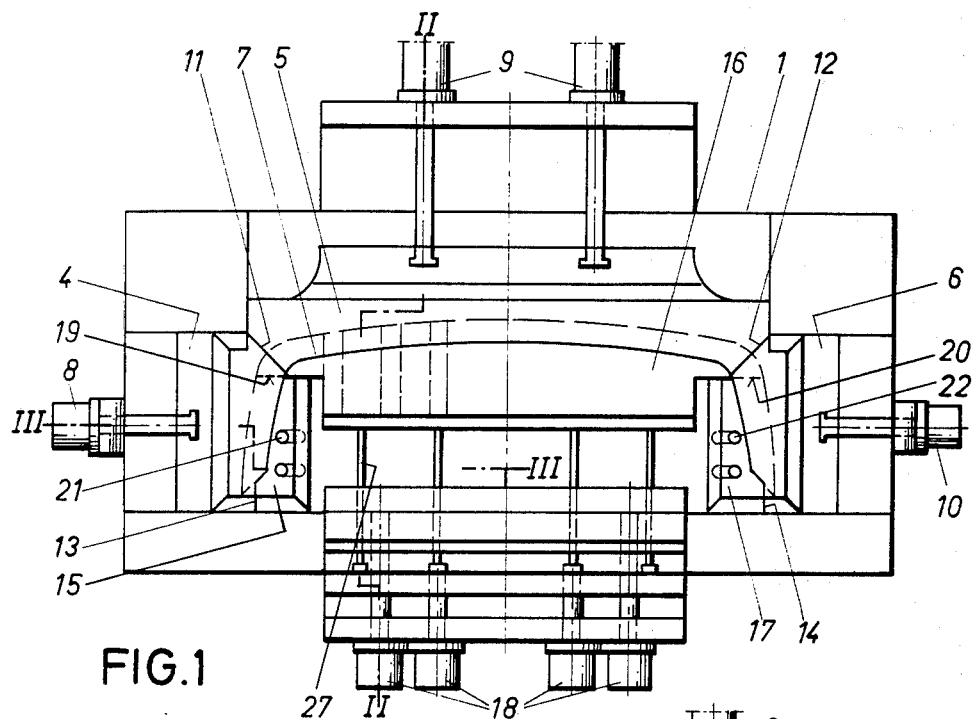
FIG. 1 is an elevation of the mould half carrying the mould followers and showing the followers in their moulding positions.
Figure 2:
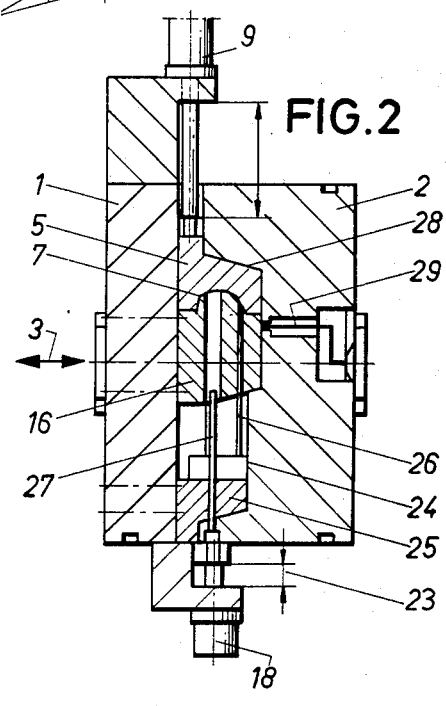
FIG. 2 is a section along the line II—II in FIG. 1, but showing both halves of the mould in the closed position; and, FIG. 3 is a section along the line III—III in FIG. 1, also showing both halves of the mould in the closed position.

The mould illustrated is for the injection moulding of automobile bumpers from plastics material, and further details of the injection moulding machine are not illustrated since these are not important to an understanding of the present invention and may be of conventional form. The mould comprises two mould halves 1, 2 which are movable relatively towards and away from one another in the direction of arrow 3 (FIG. 2). Mould followers 4, 5 and 6 for defining the external contour of the automobile bumper 7 to be injection moulded are disposed on the mould half 1 and are displaceable transversely to the direction of movement 3 of the mould halves by means of fluid pressure operated cylinders 8,9 and 10. When the mould is closed for the injection moulding operation, the mould followers 4, 5 and 6 bear one against another at contact surfaces 11 and 12. When the mould is opened displacement of the mould followers 4, 5 and 6 into their open positions (not illustrated) will release the undercut surfaces 13 and 14 of the moulded bumper 7.

Further mould followers 15, 16 and 17 are also disposed on the mould half 1, and are displaceable transversely to the direction 3 by means of fluid pressure operated cylinders 18. The mould followers 15, 16 and 17 define the internal contour of the automobile bumper 7, which is also undercut (not shown) at the ends. The mould followers 15 and 17 possess sliding contact surfaces 19 and 20 with respect to the mould follower 16, along which the mould followers 15 and 17 are displaced by means of inclined guides 21, 22 when the mould half 2 is opened and closed. Consequently, the undercut surfaces of the internal contour of the bumper are released automatically when the mould half 2 is opened, and the mould follower 16, together with the mould followers 15 and 17, can then be retracted through the stroke length 23 by means of the cylinders 18 to release the moulding.

An extractor device 24 (FIG. 2) for ejecting the moulding from the mould follower 16 transversely to the direction of movement 3 of the mould halves is also provided on the mould half 1 and operates parallel to the stroke of the cylinders 18. The extractor device 24 comprises a base 25 which is held by the mould half 1, and an extractor plunger 26 carried by the base. One or more displaceable pistons 27 of the mould follower 16 pass through the base 25, and the extractor plunger 26 passes through the mould follower 16 and forms, at its free end, a small area of the mould surface provided by the follower 16. When the mould follower 16 is retracted after the injection moulding operation, the extractor plunger 26 remains in the original position and thus exerts upon the bumper 7 the counter-force necessary to release the bumper from the mould follower 16.

Figure 3:
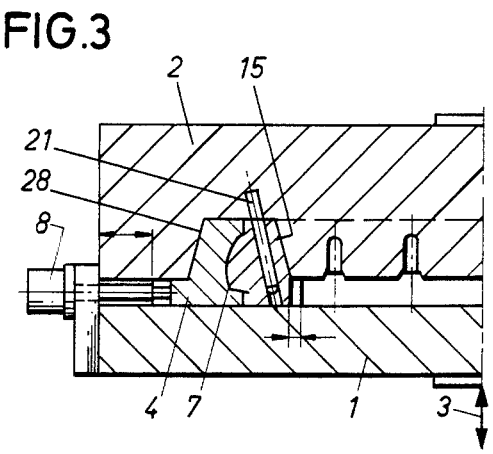

As can be seen from FIGS. 2 and 3, the mould half 2 has trapezoidal recesses 28 which receive and seat mutually opposite mould followers 4 and 15, 5 and 16, 6 and 17, engaging correspondingly tapered external surfaces of the mould followers when the mould is closed. A nozzle system 29 is provided in the mould half 2 for supplying the mould cavity formed by the mould followers with the material for moulding the bumper.

I claim:

1. An injection moulding machine, particularly for the production of injection moulded parts with the parts having an exterior contour, an interior contour, a contour width and a contour depth and with the controur width being smaller in relation to the contour depth, such as where the parts are formed as motor vehicle bumpers constructed of a synthetic material, including an injection moulding mould comprising two mould halves (1,2) displaceable relative to each other between an open position and a closed position towards and away from a closure plane of said mould halves in the closed position, a plurality of mould followers (4,5,6; 15,16,17), for forming a mould cavity and defining the external and internal contour of the injection moulded part (7), said followers being displaceably mounted on one of said mould halves transversely to the direction of movement (3) of said mould halves towards and away from the closure plane, wherein the improvement comprises that the contour depth of the injection moulded part formed by said followers extends perpendicularly to the direction of movement of said mould halves towards and away from the closure plane.

2. An injection moulding machine as claimed in claim 1, wherein all of said first mould followers are displaceable relative to said mould half on which said mould followers are mounted.

3. An injection moulding machine as claimed in claim 1, wherein said mould followers include three displaceable mould followers for defining the external contour of the product to be moulded.

4. An injection moulding machine as claimed in claim 1, wherein said mould followers include three displaceable second mould followers for defining the internal contour of the product to be moulded.

5. An injection moulding machine as claimed in claim 1, wherein said displaceable first mould followers are displaceable in directions which are at right angles to said second mould followers.

6. An injection moulding machine as claimed in claim 1, including an extractor device for ejecting the moulded part transversely to said direction in which said mould halves move relatively toward and away from one another when said mould halves are opened, said extractor device being mounted on said mould half which mounts said mould followers.

7. An injection moulding machine as claimed in claim 6, wherein said extractor device is operative to eject said moulded part in a direction parallel to the displacement direction of one of said first and second mould followers.

8. An injection moulding machine as claimed in claim 7, wherein said one of said displaceable first and second mould followers includes a displacement piston, and said extractor device comprises a base fixed to said mould half on which said mould followers are mounted, and an extractor plunger carried by said base, said base having means through which said displacement piston extends.

9. An injection moulding machine as claimed in claim 6, wherein said extractor device has a portion which forms a part of the surface of said mould cavity when said mould is closed.

10. An injection moulding machine as claimed in claim 1, wherein the other of said mould halves is provided with recesses for receiving and seating mutually opposite ones of said first and second mould followers defining mutually opposite portions of said internal and external contours of the part to be moulded when said mould is closed.

11. An injection moulding machine as claimed in claim 10, wherein said recesses are trapezoidal in cross-section.

* * * * *